Figures 1, 8:
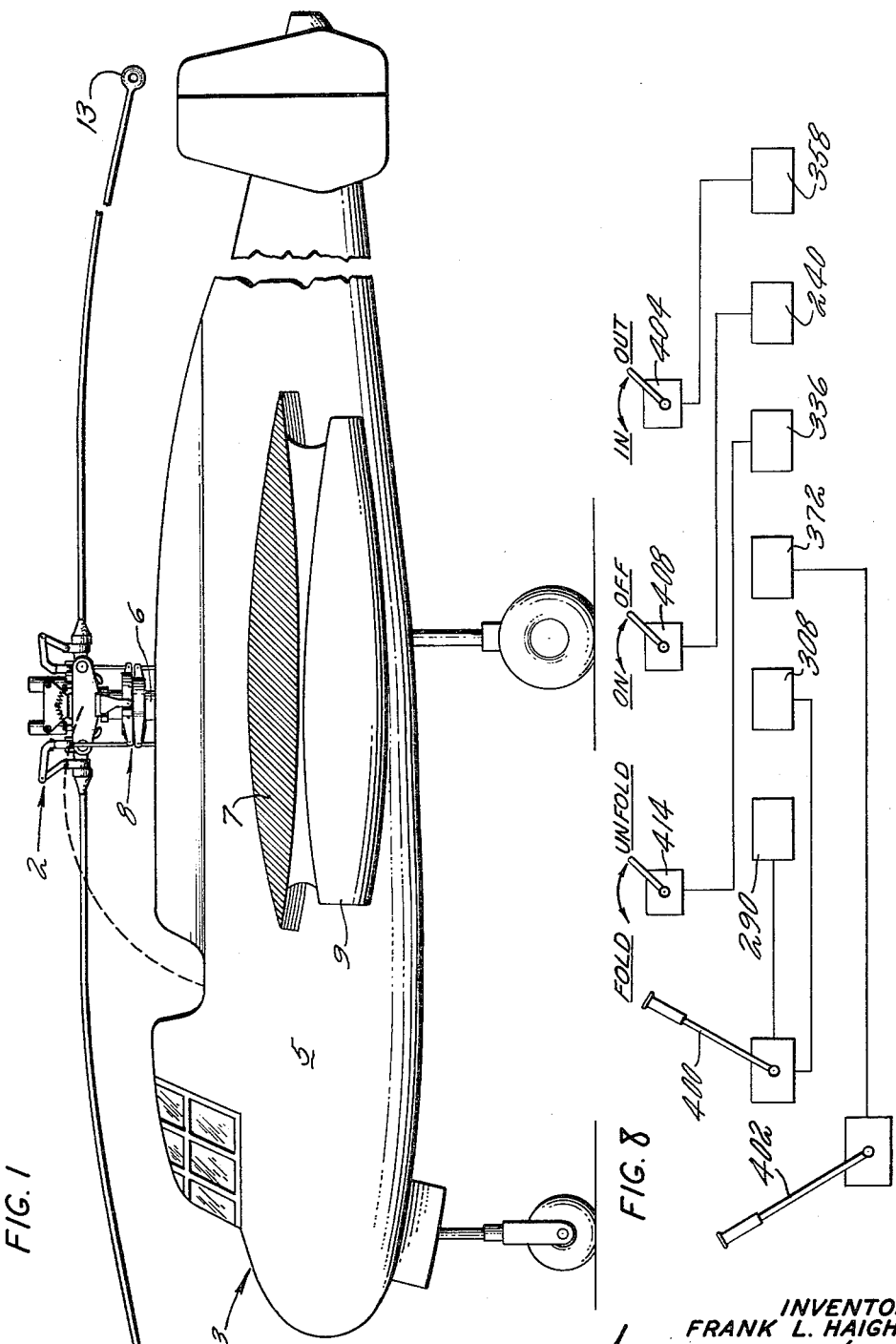

Aug. 21, 1962 — F. L. HAIGHT — 3,050,274
TILTING ROTOR HEAD SYSTEM
Filed Oct. 1, 1959 — 6 Sheets-Sheet 1

INVENTOR
FRANK L. HAIGHT
BY Jack N. McCarthy
AGENT

INVENTOR
FRANK L. HAIGHT
BY Jack N. McCarthy
AGENT

Aug. 21, 1962 F. L. HAIGHT 3,050,274
TILTING ROTOR HEAD SYSTEM
Filed Oct. 1, 1959 6 Sheets-Sheet 5

INVENTOR
FRANK L. HAIGHT
BY
AGENT

Aug. 21, 1962   F. L. HAIGHT   3,050,274
TILTING ROTOR HEAD SYSTEM
Filed Oct. 1, 1959   6 Sheets-Sheet 6
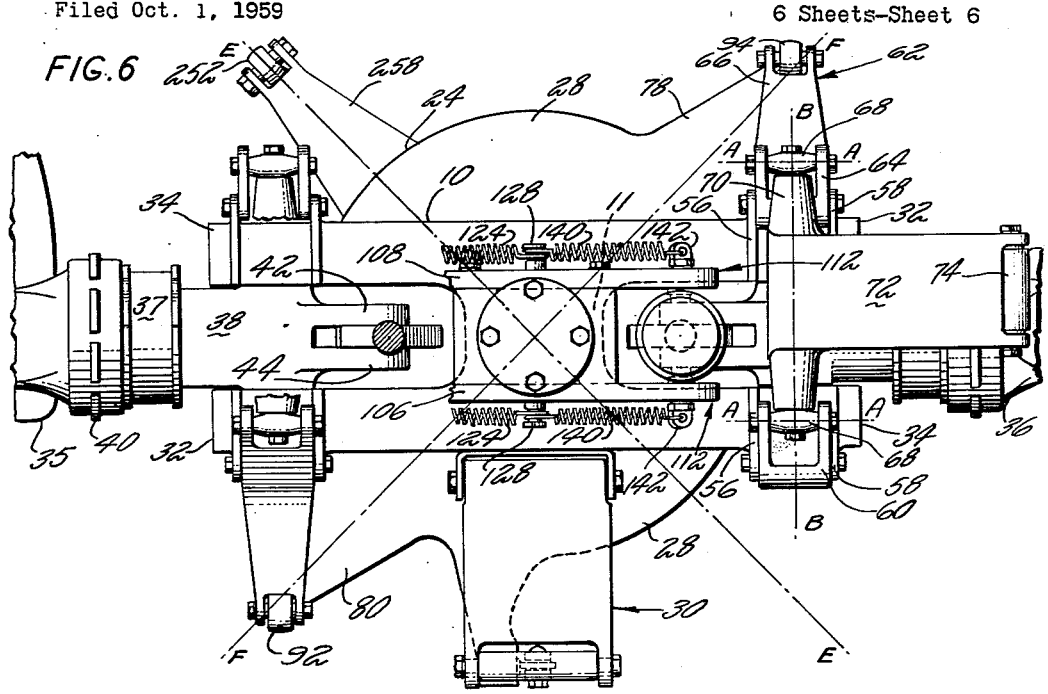
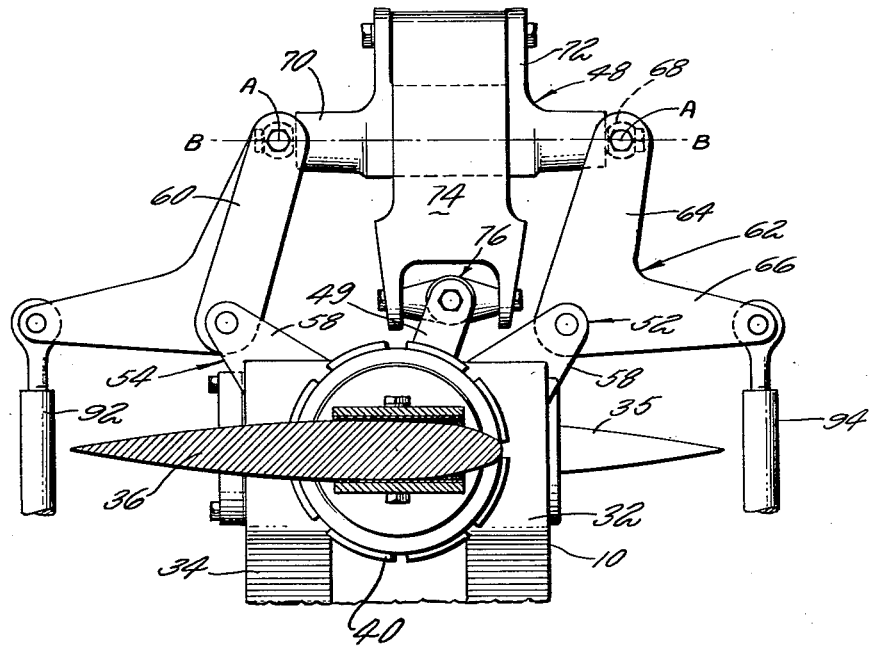
INVENTOR
FRANK L. HAIGHT
BY Jack N. McCarthy
AGENT United States Patent Office 3,050,274
Patented Aug. 21, 1962

3,050,274
TILTING ROTOR HEAD SYSTEM
Frank L. Haight, Milford, Conn., assignor to United Aircraft Corporation, East Hartford, Conn., a corporation of Delaware
Filed Oct. 1, 1959, Ser. No. 843,673
31 Claims. (Cl. 244—7)

This invention relates to means for tilting a rotor head and folding the blades thereof to provide for conversion between helicopter operation and conventional aircraft operation in a convertiplane.

An object of this invention is to provide a rotor head which will tilt with respect to an aircraft permitting the axis of rotation of its sustaining rotor blades to be placed substantially lengthwise of the aircraft.

Another object of this invention is to provide means for folding the blades of a rotor head so that they rotate about their flapping hinges between an operating and a stowed position.

A further object of this invention is to provide controls for a tilting rotor head which will actuate the blades in a desired manner—that is, provide the proper cyclic and collective pitch movement at the desired time.

Another object of this invention is to provide a novel means for conveying pitch changing movements from the control to each blade.

A further object of this invention is to provide means for tilting a rotor head while maintaining the blade angle of attack relative to the air stream substantially constant.

Another object of this invention is to provide means for changing the pitch of the blades of a rotor head at any tilted position of the rotor head.

A further object of this invention is to provide a flapping control for the blades which fixes the blades against flapping in one range of rotor head speed and permits a limited degree of flapping in another range.

Another object of this invention is to provide means for folding the blades of a rotor head about their flapping axes using the blade flapping restraining device.

A further object of this invention is to provide a swash plate mechanism pinned through a vertical slot in a fixed shaft support to permit vertical swash plate travel while providing a fixation point for the stationary position of the swash plate mechanism.

Another object of this invention is to provide for conveying pitch changing movement from the swash plate to the blade which includes a linkage formed as a parallelogram.

Other objects and advantages will be apparent from the specification and claims, and from the accompanying drawings which illustrate an embodiment of the invention.

Figure 2:
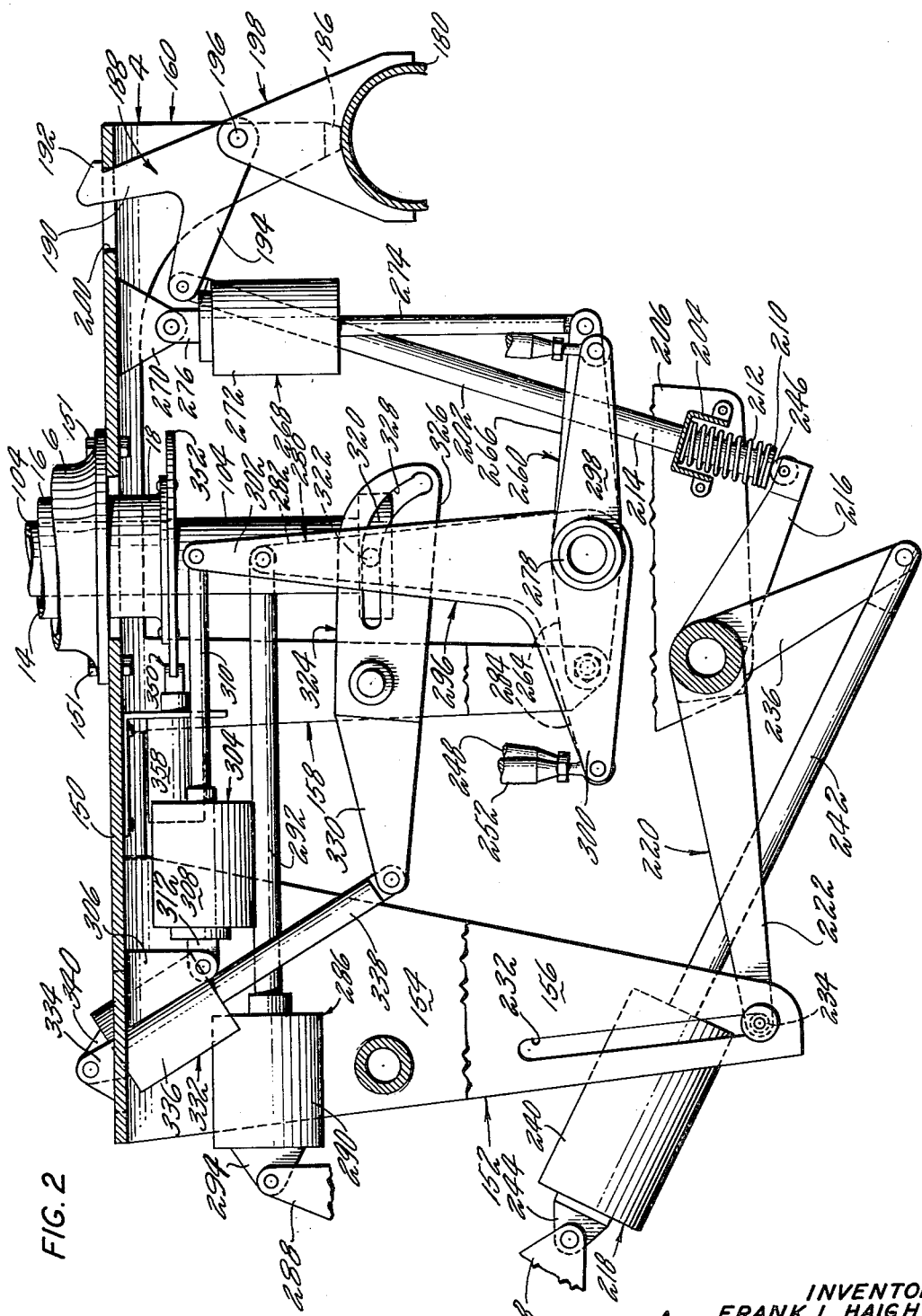
Figure 3:
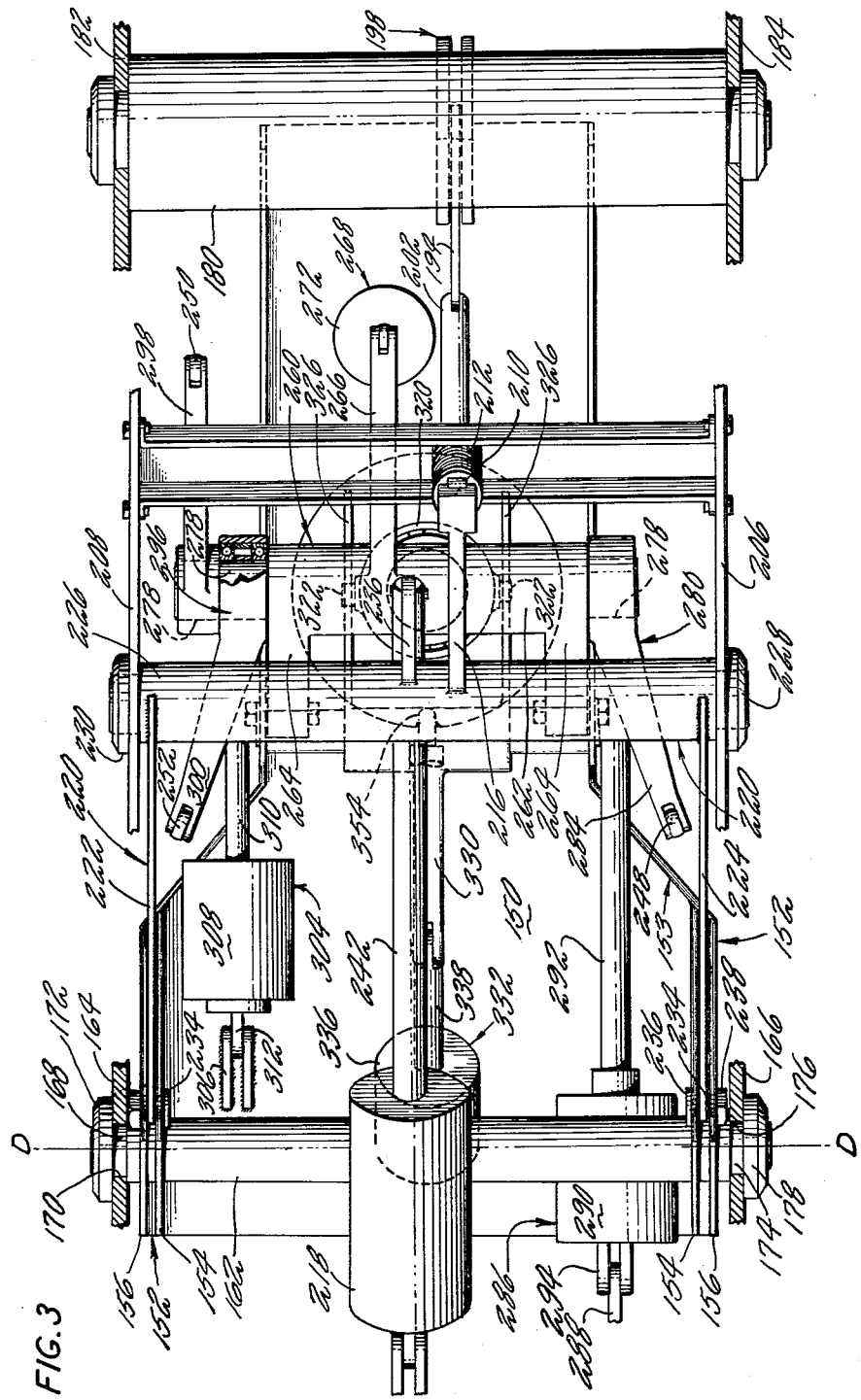
Figure 4:
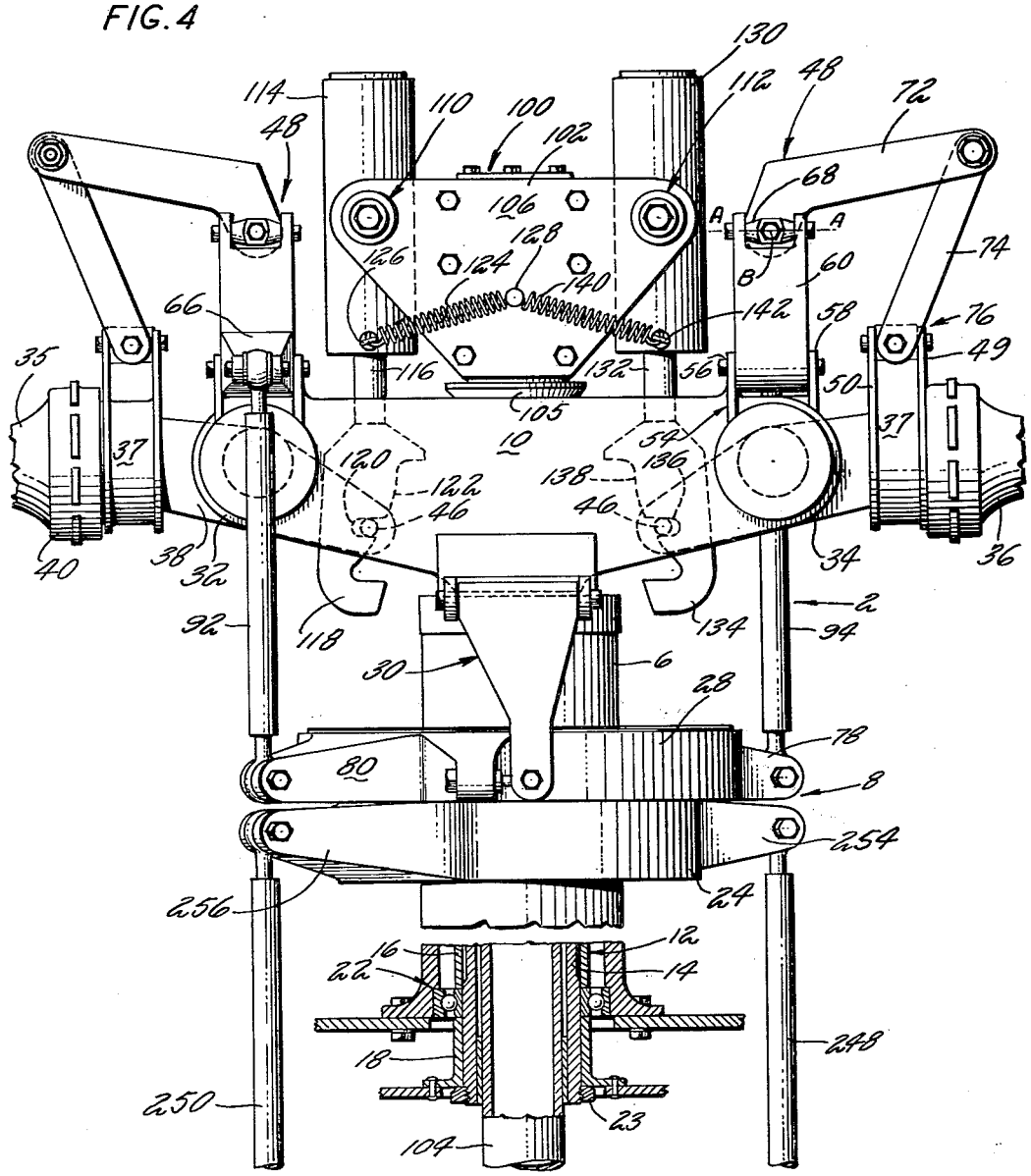
Figure 5:
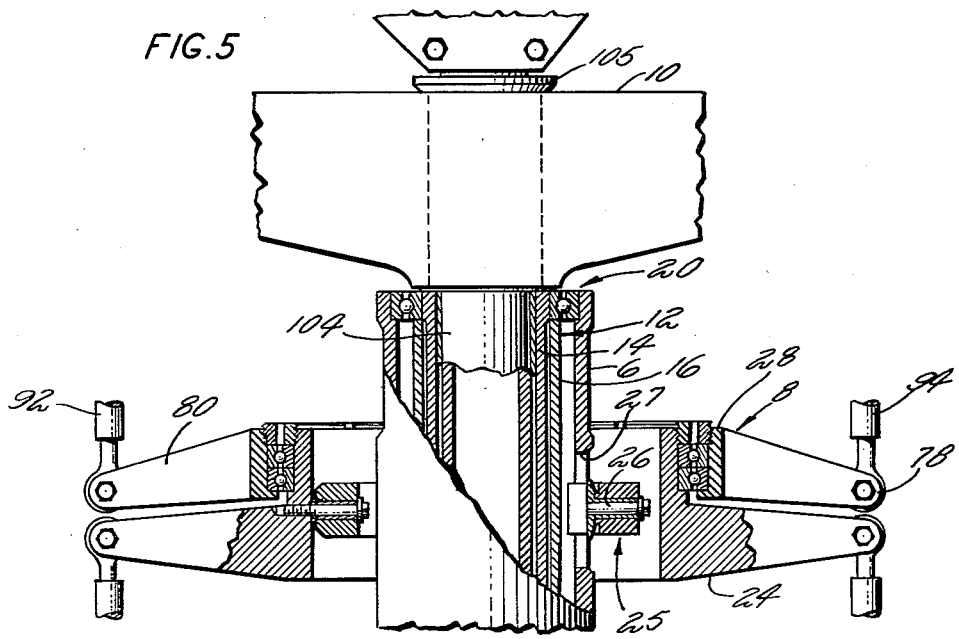

In the drawings:
FIG. 1 is a side view of an aircraft including the invention;
FIG. 2 is a side view of the tilting rotor head base and actuating mechanism;
FIG. 3 is a bottom view of FIG. 2;
FIG. 4 is a rear view of the rotor head;
FIG. 5 is an enlarged view of the upper part of the fixed mast;
FIG. 6 is a top view of the rotor head with a portion of the folding mechanism removed;
FIG. 7 is a view of the pitch changing linkage; and
FIG. 8 is a diagrammatic view of one form of control means for the rotor head and tiltable base.

FIG. 1 shows an aircraft 3 having a fuselage 5 and fixed wing 7. Engines 9 are mounted on the fixed wing to give forward motion to said aircraft. A rotor head 2 is mounted on said aircraft for movement between an upright position and a position folded into the fuselage of said aircraft wherein said blades are folded rearwardly in recesses or depressions provided therefor. Tip propulsion means 13 are provided to give rotation to said rotor head. While one specific means of rotation has been disclosed, others may be used. The rotor head 2 is supported by an upstanding fixed cylindrical member 6 and in turn supports two blades 35, 36. A swash plate mechanism 8 is mounted on said fixed cylindrical member 6 and an H-shaped member 10 is mounted on its crosspiece 11 for rotation within said member 6 on cylindrical means 12.

The cylindrical means 12 comprises a separate cylinder 14 extending downwardly from the crosspiece 11 of the H-member 10 and spacer sleeves 16 and 18 which position the inner races of bearing units 20 and 22. The crosspiece 11 is fixed to the cylinder 14 between a flange 103 on the cylinder and an annular nut 105 threadably fixed to the top of cylinder 14 as it extends out of the crosspiece 11. These bearings support rotating member 10 within the fixed member 6. As shown in FIG. 4, bearing unit 20 has its inner race positioned between flange 103 and the upper part of spacer sleeve 16. The inner race of bearing unit 22 has its inner race positioned between the lower end of spacer sleeve 16 and the upper end of spacer sleeve 18. An annular nut 23 threadably engages cylinder 14 as it extends downwardly below the lower end of spacer sleeve 18. This nut 23 maintains the spacer sleeves 16 and 18 and the inner races of bearing units 20 and 22 in place.

The swash plate mechanism 8 comprises a lower swash plate 24 mounted on a gimbal joint 25 to permit a tilting movement, said gimbal joint having its inner pivots 26 slidably mounted in slots 27 in member 6 to permit axial movement of the swash plate mechanism with respect to member 6. In FIG. 5 a composite view of the gimbal joint is shown. The right side of the joint is shown connected to the member 6 while the left side is shown connected to the swash plate 24. The planes of these connections are actually 90° apart. An upper swash plate 28 is mounted on lower swash plate 24 for tiltable and axial movement therewith and for rotation thereon. The rotatable swash plate 28 and the rotating H-member 10 are interconnected by a scissors arrangement 30 which maintains like rotation between the two members.

Each projecting end of the H-member 10 projects as a bifurcated member having arms 32 and 34. Each blade is connected to a rotating member 37 on a blade supporting member 38 by an attaching member 40. This provides for movement of each blade about its longitudinal axis (pitch change). Each blade supporting member 38 is pivotally mounted between the arms of its respective bifurcated portion of H-member 10 to provide a hinge for flapping movement of its blade. Each of the blade supporting members 38 extends inwardly toward the center of the rotor head formed as a bifurcated portion having arms 42 and 44. A pin 46 is positioned adjacent the free inwardly extending ends of each set of arms 42, 44 and is connected between said arms.

Pitch actuating means 48 is provided for each blade so that it can rotate the cooperating rotating member 37. Since the pitch actuating means 50 is substantially the same for each blade, only the means for actuating blade 36 will be described. Each rotating member 37 has a pair of arms 49 and 50 extending upwardly therefrom while each cooperating end of H-member 10 includes a pair of brackets 52 and 54 mounted one each on arms 32 and 34, respectively. These brackets extend upwardly with each having two tines 56 and 58 spaced longitudinally along the length of the H-member. These brackets may be integral or fixed thereon by any means desired.

A link 60 is pivoted at one end between the tines 58 and 56 of the bracket 54, and a bell crank 62 is pivoted between the tines 58 and 56 of the bracket 52. Link 60 and one arm 64 of the bell crank 62 are of the same length and positioned parallel to each other. The other arm 66 of the bell crank extends forwardly and forms an acute angle with arm 64 and is the actuating arm. The upper ends of the link 60 and arm 64 are bifurcated and each has a small block 68 pivotally mounted therein on an axis A—A. Another link 70 is pivotally mounted between the adjacent blocks 64 on an axis B—B. Link 60, arm 64 and link 70 move as a parallel linkage. This link 70 has an arm 72 extending therefrom which extends outwardly over its respective blade and is bifurcated at its free end. Another link 74 is pivotally mounted at its upper end between the bifurcations of arm 72 and extends downwardly therefrom and is attached at its lower end by a universal joint 76 to a point between cooperating arms 49 and 50.

The only difference between the pitch actuating means provided for blade 35 from that shown for blade 36 is the construction of bell crank 62. For the mechanism attached to blade 35, the bell crank forms an obtuse angle. In the position shown in FIG. 7, this permits the respective arms 66 of the bell cranks of both blades to extend substantially in the same plane. Referring to the pitch actuating means just described, it can be seen that as an arm 66 of bell crank 62 is moved, the other arm 64 of the bell crank will move as will link 60 through the connection of link 70, this movement of link 70 provides for like movement of arm 72 which is fixed to link 70 and extends therefrom. Movement of the free end of arm 72 is transferred to the free end of arms 49 and 50 by link 74 thereby rotating member 37, which in turn rotates the attached blade. It is to be noted that this pitch actuating means is operative to control the pitch of the blade at any position of the blade about its flapping and folding hinge.

The pitch actuating means for blade 36 has the free end of arm 66 connected to the free end of a projection 78 on upper swash plate 28 by an adjustable rod 94 having ball-joint connections at both ends. The pitch actuating means for blade 35 has the free end of arm 66 connected to the free end of a projection 80 on upper swash plate 28 by an adjustable rod 92 having ball-joint connections at both ends. As the lower swash plate 24 is positioned both in tilting and in axial translation (cyclic and collective pitch changes) by the pilot control means to be hereinafter described, this movement is conveyed through the upper swash plate 28 to the rods 92 and 94.

A restraining mechanism 100 is provided for fixing each blade against flapping during rotation of rotor head 2 through one range of speeds and permitting a limited amount of movement in flapping through another range. This restraining device 100 comprises a head 102 fixed to the top of a shaft 104 which passes through cylinder 14. Shaft 104 has suitable bearing means between it and cylinder 14. This bearing means permits relative axial movement between shaft 104 and cylinder 14 for a purpose to be hereinafter described. Shaft 104 is prevented from rotating with respect to cylinder 14 and the top of H-member 10 by the cooperation of a projection extending from annular nut 105 fixed to the top of cylinder 14 into an axially extending groove along shaft 104. Head 102 includes two plates 106 and 108 fixed on opposite sides of a block 109 fixed to the top of shaft 104 to form diametrically opposed brackets 110 and 112. These brackets are positioned so that a plane passing vertically through both of them will pass between the side members of H-member 10.

A damper 114 has its cylindrical housing pivoted at its mid-portion in bracket 110. The damper piston mounted therein has its piston rod 116 extending downwardly between the open section on the side of H-member 10 on which blade 35 is attached. A restrainer hook 118 is provided at the free end of piston rod 116 with its hook facing inwardly so that it can contact and engage pin 46 of blade 35. The opening of the hook is formed having a single deep cut 120 for restraining pin 46 in one position and a long cut 122 for permitting pin 46 to move between the limits formed at the end of the long cut. The face of the hook opening is biased toward the pin 46 by a pair of springs 124 which are located one on each side of the head 102 and which are connected between projections 126 on the bottom of the cylinder 114 and projections 128 located at the center line of the plates 106 of the head 102.

Restraining mechanism 100 also includes a damper 130 which has its cylindrical housing pivoted at its mid-portion in bracket 112. This damper 130 has a piston rod 132 extending therefrom in the same manner as in damper 114. A restrainer hook 134 is provided at the free end of piston rod 132 with its hook facing inwardly so that it can contact and engage pin 46 of blade 36. The opening of the hook is formed having a single deep cut 136 for restraining pin 46 in one position and a long cut 138 for permitting pin 46 to move between the limits formed at the end of the long cut. The face of the hook opening is biased towards the pin 46 by a pair of springs 140. These springs, like springs 124, are located one on each side of the head 102 and are connected between the projections 142 on the bottom of damper 130 and projections 128 located at the center line of the plates 106 of the head 102. The hooks 118 and 134 are moved to an outer position by centrifugal force permitting the pins to have a limited movement.

The upstanding fixed cylinder member 6 which supports the rotor head 2 is attached to an upper plate 150 of the tiltable base 4 by bolts 151. The tiltable base 4 includes upper plate 150 which is wide for approximately one-third of its forward length and tapers down at 153 to a narrower width for its rear portion. Three pairs of projections extend downwardly from each side edge of plate 150. One pair of projections 152 extends downwardly from the forward wide portion of the plate 150, each projection comprising two plates 154 and 156 which are placed adjacent to one another to provide a guide action therebetween. These projections 152 are shown extending downwardly approximately two-thirds of the length of base plate 150. A second pair of projections 158 extends downwardly from the side edges of the narrow width of the base plate 150 at a point adjacent to the mid-line of base 4 and approximately at the forward connection of member 6 to base plate 150. A third pair of projections 160 extends downwardly from the rear edge of base plate 150 and serves as positioning means for the base 4 in its fixed operating position.

Base 4 is tiltable about an axis D—D. This tilting axis is formed by a tubular member 162 which extends between the pair of projections 152 and therethrough to plate members 164 and 166 which are fixed to helicopter structure. One end of tube 162 is necked down at 168 and extends through an opening 170 in fixed plate 164. The necked down portion extending through the plate 164 is threaded and the nut member 172 is threadably mounted thereon. The other end of tube 162 is necked down at 174 and extends through an opening 176 in fixed plate 166. The necked down portion 174 extending through the plate 176 is threaded and a nut 178 is threadably mounted thereon. Tubular member 162 is fixed to both plates 154 and 156 of both projections 152. This may be done by brazing, welding or any other suitable method. Each of the nuts 172 and 178 are positioned on their respective ends of tubular member 162 so that the tubular member may rotate within fixed plates 164 and 166 thereby permitting base 4 to tilt about the axis D—D of the tubular member 152. They are then locked in place by any suitable nut-locking means.

As stated hereinbefore, the pair of projections 160 engage a member 180 which is fixed to helicopter structure to position the tiltable base 4 in its substantially horizontal operating position. Member 180 extends between and is fixed to plate members 182 and 184 which are fixed to the helicopter. While the member 180 is shown fixed to helicopter structure in a particular manner, any satisfactory means can be used. Projections 160 each have a hard rubber pad 186 at their free end which engages member 180. Adjustable means may be used on these projections if it is deemed necessary.

To hold the rear end of base 4 in position, a hook device 188 is provided which is formed as a bell crank lever with one arm 190 having a hook projection 192 while the other arm 194 is the actuating arm. The bell crank lever is pivoted at 196 to a bracket 198 fixed to member 180. Thee bracket 198 extends upwardly from member 180. Arm 190 extends generally upwardly from its pivotal point 196 and its free end extends through a hole 200 at the rear of plate 150. In its locked position projection 192 extends rearwardly over the plate 150 to engage it and hold the base rigid.

A rod member 202 is attached at one end to the free end of arm 194. The other end of rod 202 passes downwardly through a channel member 204 which is fixed between two plates 206 and 208 which are fixed to helicopter structure. Plates 206 and 208 are spaced apart a distance greater than the width of the forward part of plate 150. A plate 210 having a diameter larger than rod 202 is fixed at the free end of said rod and a spring 212 is mounted on rod 202 between plate 210 and channel member 204. This arrangement biases 192 downwardly and therefore biases the hook device 188 into its unlocked position. A pin 214 is provided in rod 202 as a stop to limit the downward motion of rod 202. Hook device 188 is held in its locked position, the position shown in FIG. 1, by a lever arm 216, to be hereinafter described.

The mechanism for tilting the base 4 comprises an actuating device 218 and a bell crank lever 220. Bell crank lever 220 is formed having two forwardly projecting arms 222 and 224 in the same plane which are fixed to a tubular member 226. Tubular member 226 is mounted for rotation between plates 206 and 208. This tubular member extends between the plates 206 and 208 and has a necked down portion at each end extending through the respective plates. The end of the necked down portions are threaded and have nuts 228 and 230 positioned thereon so that the tubular member may rotate within fixed plates 206 and 208. The nuts are then locked in place by any suitable nut-locking means.

Arm 222 extends between the plates 154 and 156 of one projection 152 and arm 224 extends between the plates 154 and 156 of the other projection 152. The free ends of these arms 222 and 224 are located adjacent cam slots 232 which are located in both plates of both projections 152. Each end of arm 222 and 224 is provided with a cam guide 234 which extends through its cooperating cam 232 in each of cooperating plates 154 and 156. Each of the cam guides is held in position by flange 236 on one side of its cooperating plate 154 and a nut 238 on the opposite side of its cooperating plate 156.

An actuating arm 236 forms the remainder of bell crank lever 220 and extends downwardly and rearwardly from tubular member 226. Actuating device 218 is connected between fixed structure 238 on the aircraft and the free end of actuating arm 236. The actuating device comprises an actuator 240 with an actuating rod 242 extending therefrom. The actuator 240 may be any device capable of imparting axial movement to rod 242, such as an electrical or hydraulic motor. Actuator 240 has a bracket 244 on one end which is pivotally connected to aircraft structure at 238 while rod 242 projects from the other end. The free end of rod 242 is pivotally attached to the free end of actuating arm 236. As the base tilts, the pitch of the blades, with reference to the fuselage, automatically remains the same.

Lever arm 216 which moves hook device 188 into its locked position and holds it there, extends from tubular member 226 and moves therewith. A roller 246 is provided at the free end of arm 216 for engagement with the bottom of plate 210. In the position shown in FIG. 1, it can be seen that as the actuating device 218 places the tiltable base 4 in its substantially horizontal operating position, arm 216 places the hook device in its locked position.

Pilot control means are provided to position the lower swash plate 24 both in tilting and in translation to obtain desired cyclic and collective pitch changes. Lower swash plate 24 is moved to a desired position by the use of three actuating rods 248, 250 and 252. Rods 248 and 250 are connected to projections 254 and 256, respectively, which extend from diametrically opposed positions on swash plate 24. Projection 254 extends at an angle of approximately 45° from the longitudinal axis of the aircraft between the right-hand side and forward part of the aircraft. The projection 226, therefore, extends at an angle of approximately 45° from the longitudinal axis of the aircraft between the left-hand side and rearward part of the aircraft. Rod 252 is connected to a projection 258 which extends from lower swash plate 24 at an angle of approximately 45° from the longitudinal axis between the left side and the forward part of the aircraft.

It can be seen that movement of rods 248 and 250 in opposite directions an equal amount will tilt the lower swash plate about an axis E—E. Axis E—E lies in the plane of the lower swash plate and passes through the center of rotation of the rotor head 2 and the point where rod 252 is connected to projection 258. Movement of rod 252 will tilt the lower swash plate about an axis F—F. Axis F—F lies in the plane of the lower swash plate and passes through the points where rods 248 and 250 are connected to projections 254 and 256. Axes E—E and F—F are generally perpendicular to each other. Various combinations of movements of rods 248, 250 and 252 will produce tilting of lower swash plate 24 in any direction and in any desired degree. Movement of all three of these rods an equal amount will provide a collective pitch movement and move swash plate 24 axially along mast 6 with pivots 26 moving along slots 27.

The controls provided for the desired movement of rods 248, 250 and 252 include a collective pitch link 260. This link is formed having a tubular section 262 with one portion of the link extending therefrom as two arms 264 from each end of the tubular member 262. These arms 264 are located apart a distance so that they fit inside of the lower ends of projections 158. Each arm is pivotally mounted at its forward end to the projection 158 which is adjacent thereto. The remainder of link 260 extends in the other direction from arms 264 as a single arm 266. The free end of arm 266 is connected by an actuating device 268 to fixed bracket 270 extending downwardly from plate 150.

Actuating device 268 comprises an actuator 272 with an actuating rod 274 extending therefrom. The actuator 272 may be any device capable of imparting axial movement to rod 274. Actuator 272 has a bracket 276 on one end which is pivotally connected to bracket 270 on tiltable base 4 while rod 274 projects from the other end. The free end of rod 274 is pivotally attached to the free end of arm 266 of collective pitch link 260.

Tubular section 262 of link 260 rotatably supports a shaft 278. This shaft projects from the right side an amount so that a bell crank lever 280 can be fixedly mounted thereon. Bell crank lever 280 comprises an arm 282 which projects upwardly from its fixed mounting to shaft 278 and an arm 284 which projects forwardly from this fixed mounting. The free end of arm 284 is connected to the lower end of actuating rod 248 by a ball-joint connection. The free end of arm 282 is connected by an actuating device 286 to fixed structure 288 on the aircraft. The actuating device 286 comprises an actuator 290 with an actuating rod 292 extending therefrom. Actuator 290 has a bracket 294 on one end which is pivotally connected to aircraft structure 288 while rod 292 projects from the other end. The free end of rod 292 is pivotally attached to the free end of actuating arm 282.

The other end of shaft 278 projects from the left side an amount which permits a bell crank lever 296 to be pivotally mounted thereon adjacent the tubular member 262 and permits an arm 298 to be fixed to the end thereof adjacent the bell crank lever 296. Arm 298 extends rearwardly from shaft 278 and has its free end connected to the lower end of actuating rod 250.

It can be seen that axial movement of rod 292 rocks arm 282 about the rotational axis of the shaft 278. This movement of arm 282 rotates shaft 278 and therefore arms 284 and 298 which are fixed thereto. These arms move a like amount in opposite directions to provide the actuating movement for actuating rods 248 and 250, respectively. The actuator 290, therefore, provides movement of the swash plate mechanism 8 and positions blades 35 and 36 so that a change in longitudinal movement of the helicopter is obtained.

Bell crank lever 296 which is mounted for rotation on shaft 278 between arm 298 and tubular section 262 comprises an arm 300 which projects in a forwardly direction and an arm 302 which projects in an upwardly direction. The free end of the lever 300 is connected to the lower end of actuating rod 252 by a ball-joint connection. The free end of arm 302 is connected by an actuating device 304 to fixed bracket 306 extending downwardly from plate 150. The actuating device 304 comprises an actuator 308 with an actuating rod 310 extending therefrom. Actuator 308 has a bracket 312 on one end which is pivotally connected to bracket 306 while rod 310 projects from the other end. The free end of rod 310 is pivotally attached to the free end of actuating arm 302. Axial movement of rod 310 actuates bell crank 296, therefore actuating rod 252. The actuator 308, therefore, provides movement of the swash plate mechanism 8 and positions blades 35 and 36 so that a change in lateral movement of the aircraft is obtained.

It can now be seen that the actuator 272 rocks collective pitch link 260 about the rotational axis of the forward end of arms 264. This movement of link 260 moves shaft 278 through an arc which transmits a substantial up and down motion to arms 284, 300 and 298. This up and down movement moves the swash plate mechanism axially to effect collective pitch.

The restraining mechanism 100, described hereinbefore and set forth as being mounted on a shaft 104 within cylinder 14 and having axial movement therein also serves as part of the folding mechanism. Folding is done at zero rotation of the rotor head after the rotor head has been positioned at its proper place. An indexing means 350 is provided to position and hold the rotor in its proper position.

When the rotor is no longer needed for operations and lift of the aircraft is supplied by the fixed wing 7, the blades 35 and 36 are positioned so that pins 46 are in the cuts 120 and 136, respectively, and the indexing means is engaged. The indexing means 350 includes an annular plate 352 with a notch 354 on its outer circumference. A detent 356, moveable between an extended notch engaging "In" position and a retracted out-of-engagement "Out" position, is operable by the pilot. When the blades have been positioned in their proper position, the detent 356 is moved to engage notch 354. The detent actuator 358, which is fixed to plate 150 by a bracket 360, can be a solenoid device. The rotor head is then placed in its tilted position.

With the rotor head in its tilted position, the blades can be rotated about their flapping hinges to place them against the sides of the fuselage of the aircraft in longitudinal depressions 325. With the construction as shown (see FIG. 4), it is only necessary to move the restraining mechanism axially in cylinder 14 to move the blades about their flapping hinges. Proper pitch positioning of the blades can be made through the regular pilot-operated controls since they are operative at any tilted position of base 4.

Shaft 104 extends downwardly out of cylinder 14 and has an annular member 320 which is rotatably mounted at the end of shaft 104 projecting into the tiltable base. This annular member is formed having cam guide members 322 projecting from each side thereof. A blade folding lever 324 is pivotally mounted adjacent its midportion between the projections 158. Blade folding lever 312 is formed having two rearwardly extending arms 326 which extend one on each side of the annular member 320 so that cam guide members 322 extend into cams 328 formed in the side of each arm 326. A single arm 330 extends forwardly from the pivotal mounting of lever 324. An actuating device 332 connects the free end of arm 330 to a bracket 334 on plate 150.

Actuating device 322 comprises an actuator 336 with an actuating rod 338 extending therefrom. The actuator 336 may be any device capable of imparting axial movement to rod 338. Actuator 336 has a bracket 340 on one end which is pivotally connected to bracket 334 on tiltable base 4 while rod 338 projects from the other end. The free end of rod 338 is pivotally attached to arm 330 of blade folding lever 324. As actuator 336 moves rod 338 axially, shaft 104 is moved axially through the action of cam 328 on cam guide members 322. This action in turn moves head 102 and pivots blades 35 and 36 about their flapping hinges through hooks 118 and 134.

In FIG. 8 the control means comprises a cyclic pitch lever 400 which is connected to the actuator 290 of the actuating device 286. Longitudinal movement of lever 400 controls movement of the actuator 290. Lever 400 is also connected to actuator 308 of the actuating device 304. Lateral movement of the lever 400 controls movement of this actuator 308. A collective pitch lever 402 is connected to actuator 272 of actuating device 268. Movement of lever 402 actuates the actuator 272.

A rotor head position control device 404 is connected to the detent actuator 358 for controlling its movement. This position control device 404 can be moved between an "In" and an "Out" position corresponding to the "In" and "Out" position of the detent 356, for positioning said detent. A base control device 408 is provided which is connected to the actuator 240 of the actuating device 218 for controlling its movement. This base control device 408 is moveable between an "On" and "Off" position. A blade folding control device 414 is connected to actuator 336 of the actuating device 322 for controlling its movement. This folding control device 414 can be moved between a "fold" and "unfold" position. In actual operation, when the rotor is no longer desired for flight, the blades are moved to a position so that the notch 354 is located to receive the detent 356. This blade positioning can be done by the use of cyclic pitch lever 400. The position control device 404 is then moved to its "In" position and the detent 356 is moved into the notch 354. Next, with the blades at zero pitch, the base control device 408 is moved to its "On" position and the rotor head is folded forwardly into the aircraft. The blades maintain their original pitch position while the rotor head folds forwardly. Then, the blades are moved to flat pitch and the folding control device 414 is moved to its "fold" position and the blades are folded rearwardly into their respective depressions. These movement, those initiated by the position control device 404, the base control device 408 and the folding control device 414, can be interconnected by a network of safety devices which will safeguard against improper movement of any of the control devices. Conventional controls can be used for operation of the aircraft as a conventional airplane.

It is to be understood that the invention is not limited to the specific description above or to the specific figures, but may be used in other ways without departure from its spirit as defined by the following claims.

I claim:

1. In combination in an aircraft, a rotor head having a plurality of blades, a mounting base on which said rotor head is supported, means for tilting said base thereby tilting said rotor head, and means for folding said blades rearwardly in flight.

2. In combination in an aircraft, a rotor head having a plurality of blades, a mounting base on which said rotor head is supported, said base being tiltably mounted, means for tilting said base thereby tilting said rotor head, each blade having hinge means about which the blade can fold, and means for folding said blades rearwardly about their hinge means in flight.

3. In combination in an aircraft, a rotor head having a plurality of blades, a mounting base on which said rotor head is supported, said base being tiltably mounted, means for positioning said rotor head for tilting, means for tilting said base thereby tilting said rotor head, each blade having hinge means about which the blade can fold, and means for folding said blades rearwardly about their hinge means in flight.

4. In combination in an aircraft, a rotor head having a plurality of blades, said blades being mounted for pitch change, a mounting base on which said rotor head is supported, said base being tiltably mounted, means for positioning said rotor head for tilting, pilot means for controlling blade pitch, means for tilting said base thereby tilting said rotor head, each blade having hinge means about which the blade can fold, and means for folding said blades rearwardly about their hinge means in flight.

5. In combination in an aircraft, a rotor head having a plurality of blades, said blades being mounted for pitch change, a mounting base on which said rotor head is supported, said base being tiltably mounted, means for positioning said rotor head for tilting, means for controlling blade pitch, means for tilting said base thereby tilting said rotor head, said pitch control means being operable to automatically maintain a given blade pitch during tilting of the rotor head, each blade having hinge means about which the blade can fold, and means for folding said blades rearwardly about their hinge means in flight.

6. In combination in an aircraft, a fuselage, a rotor head above said fuselage having a plurality of blades, said blades being mounted for pitch change, a mounting base on which said rotor head is supported, said base being tiltably mounted on said fuselage, means for positioning said rotor head for tilting, pilot means for controlling blade pitch, means connected between said fuselage and said base for tilting said base thereby tilting said rotor head, each blade having hinge means about which the blade can fold, and means connected between said blades and said base for folding said blades rearwardly about their hinge means in flight when said base has been tilted.

7. In combination in an aircraft, a fuselage, a rotor head having a plurality of blades, said blades being mounted for pitch change, a mounting base on which said rotor head is supported, said base being tiltably mounted, means for positioning said rotor head for tilting, first means for controlling collective blade pitch, second means for controlling cyclic pitch to produce longitudinal movement of said fuselage, third means for controlling cyclic pitch to produce lateral movement of said fuselage, means for actuating said third means operatively connected between said third means and said base, means for actuating said second means operatively connected between said second means and said fuselage, means for tilting said base thereby tilting said rotor head, each blade having hinge means about which the blade can fold, and means for folding said blades rearwardly about their hinge means.

8. In combination in an aircraft, a rotor head having a plurality of blades, a mounting base on which said rotor head is supported, means pivotally mounting said base at one end, means for releasably locking said base at its other end, means for tilting said base thereby tilting said rotor head, and means for folding said blades in flight.

9. In combination in an aircraft, a fuselage, a rotor head having a plurality of blades, a mounting base on which said rotor head is supported, first means pivotally mounting said base at one end, second means for releasably locking said base at its other end, third means for tilting said base thereby tilting said rotor head, and fourth means for folding said blades in flight, said base including a pair of arms extending from said one end, said first means being located between said arms and said fuselage, said third means being connected between said arms and said fuselage.

10. In combination, a rotor head having a blade supporting member, a plurality of blades attached thereto each on a flapping axis, a mounting base on which said blade supporting member is mounted for rotation, means for tilting said base thereby tilting said rotor head, and means for folding each blade rearwardly about its flapping axis in flight.

11. In combination, a rotor head having a blade supporting member, a plurality of blades attached thereto each on a flapping axis, a mounting base, a fixed hollow mast extending from said base on which said blade supporting member is mounted for rotation, means for tilting said base thereby tilting said rotor head, and means for folding each blade in flight about its flapping axis including a second member mounted for axial movement within said hollow mast and blade supporting member, said second member being connected to said blades.

12. In combination in an aircraft, a fuselage, a rotor head having a plurality of blades, a mounting base, said mounting base having a fixed mast extending therefrom, said rotor head being supported for rotation by said mast, means for tilting said base and mast thereby tilting said rotor head, and means for folding said blades in flight when said base and mast have been tilted.

13. In combination in an aircraft, a fuselage, a rotor head having a plurality of blades, a mounting base, said mounting base having a hollow fixed mast extending therefrom, said rotor head having a tubular member extending therefrom, said tubular member being supported for rotation by said hollow mast, means for tilting said base and mast thereby tilting said rotor head, means for positioning said rotor head before tilting, and means for folding said blade in flight when said base and mast have been tilted.

14. In combination in an aircraft, a fuselage, a rotor head having a plurality of blades, a mounting base, said mounting base having a hollow fixed mast extending therefrom, said base being tiltably mounted, said rotor head having a tubular member extending therefrom, said tubular member being supported for rotation by said hollow mast, means for positioning said rotor head before tilting said base, means for tilting said base and mast when said rotor head has been positioned thereby tilting said rotor head, and means for folding said blades in flight when said base and mast have been tilted.

15. A rotor for an aircraft including in combination, a rotatable blade supporting member having an axis of rotation, a plurality of blades, means mounting each blade for pivotal movement about a blade flapping axis which is spaced outwardly from said axis of rotation, each blade having an arm means extending inwardly from its blade flapping axis, and means operably connected to each of said arm means for controlling flapping movement of said blades.

16. A rotor for an aircraft including in combination, a rotatable blade supporting member having an axis of rotation, a plurality of blades, means mounting each blade for pivotal movement about a blade flapping axis which is spaced outwardly from said axis of rotation, each blade having an arm means extending inwardly from its blade flapping axis, each of said arm means having a positioning member connected thereto, and means operably connected to each of said arm means for controlling flapping movement of said blades, said last named means having a restraining member for holding each positioning member fixed in one position and providing for restricted movement of each positioning member in another position.

17. A rotor for an aircraft including in combination, a rotatable blade supporting member, a plurality of blades, means mounting each blade for pivotal movement about a blade flapping axis, each blade having an arm means extending inwardly from its blade flapping axis, each of said arm means having a positioning member connected thereto, and means operably connected to each of said arm means for controlling flapping movement of said blades, said last named means having restraining means for cooperating with each positioning member, said restraining means being moveable between two positions, said restraining means being operable in one position to fix its cooperating positioning members and being operable in its other position to provide for limited movement of its cooperating positioning members.

18. A rotor for an aircraft including in combination, a rotatable blade supporting member, a plurality of blades, means mounting each blade for pivotal movement about a blade flapping axis, each blade having an arm means extending inwardly from its blade flapping axis, each of said arm means having a positioning member connected thereto, and means operably connected to each of said arm means for controlling flapping movement of said blades, said last named means having a restraining member for cooperating with each positioning member, each restraining member being moveable between two positions, each restraining member being operable in a first position to fix its cooperating positioning member and being operable in a second position to provide for limited movement of its cooperating positioning member.

19. A rotor for an aircraft including in combination, a rotatable blade supporting member, a plurality of blades, means mounting each blade for pivotal movement about a blade flapping axis, each blade having an arm means extending inwardly from its blade flapping axis, each of said arms means having a positioning member connected thereto, and means operably connected to each of said arm means for controlling flapping movement of said blades, said last named means having a restraining member for cooperating with each positioning member, each restraining member being moveable between two positions, each restraining member being operable in a first position to fix its cooperating position member and being operable in a second position to provide for limited movement of its cooperating positioning member, each restraining member being biased into its first position and moveable into its second position by centrifugal force.

20. A rotor assembly for an aircraft including in combination, a rotatable blade supporting member having an axis of rotation, a plurality of blades, means mounting each blade for pivotal movement about an axis, each blade having an arm means extending inwardly from its axis, first means operably connected to each of said arm means for controlling movement of said blades, said first means including a first member projecting upwardly from said rotatable blade supporting member and an engaging member for engaging each arm means, means mounting said first member for rotation with said rotatable blade supporting member, said mounting means permitting relative axial movement between said first member and said rotatable blade supporting member, and means for moving said first member in relation to said rotatable blade supporting member for pivoting said blades about their axes.

21. A rotor for an aircraft including in combination, a rotatable blade supporting member, a plurality of blades, means mounting each blade to said member for pivotal movement about a blade flapping axis, each blade having an arm means extending inwardly from its blade flapping axis, and means operably connected to each of said arm means for moving said blades in flight about their flapping axes for folding.

22. A rotor for an aircraft including in combination, a rotatable blade supporting member, a hollow mast rotatably supporting said member, a plurality of blades, means mounting each blade to said member for pivotal movement about a blade flapping axis, each blade having an arm means extending inwardly from its blade flapping axis, and means extending through said hollow mast operably connected to each of said arm means for moving said blades in flight about their flapping axes for folding.

23. An aircraft including in combination, a rotatable blade supporting membeer, a hollow mast rotatably supporting said member, a mounting base, said hollow mast being mounted on said base, a plurality of blades, means mounting each blade to said member for pivotal movement about a blade flapping axis, each blade having an arm means extending inwardly from its blade flapping axis, first means extending through said hollow mast operably connected to each of said arm means for moving said blades in flight about their flapping axes for folding, and second means connected to said base for actuating said first means.

24. An aircraft including in combination, a rotatable blade supporting member, a hollow mast rotatably supporting said member, a mounting base, said hollow mast being mounted on said base, a plurality of blades, means mounting each blade to said member for pivotal movement about a blade flapping axis, each blade having an arm means extending inwardly from its blade flapping axis, first means extending through said hollow mast operably connected to each of said arm means for moving said blades in flight about their flapping axes for folding, second means connected to said base for actuating said first means, said second means including a lever pivoted to said base, one end of said lever being connected to said first means, and actuating means connecting the other end of said lever to said base.

25. A rotor for an aircraft including in combination, a rotatable blade supporting member, a plurality of blades, means for controlling the pitch of said blades, means mounting each blade to said member for pivotal movement about a blade flapping axis, each blade having an arm means extending inwardly from its blade flapping axis, means for tilting said rotatable blade supporting member, and means operably connected to each of said arm means for moving said blades in flight about their flapping axes for folding.

26. A rotor for an aircraft including in combination, a rotatable blade supporting member, a plurality of blades, means for controlling the pitch of said blades, means mounting each blade to said member for pivotal movement about a blade flapping axis, each blade having an arm means extending inwardly from its blade flapping axis, means for tilting said rotatable blade supporting member, and means operably connected to each of said arm means for moving said blades about their flapping axes for folding, said blades maintaining a given pitch when the rotatable blade supporting member is tilted.

27. A rotor for an aircraft including in combination, a blade supporting member, a blade, means mounting said blade on said member for pitch changing movement, a parallel linkage having two corners pivotally mounted to said blade supporting member, and means connecting said parallel linkage to said blade for transferring its movement thereto to change the pitch of said blade.

28. A rotor for an aircraft including in combination, a blade supporting member, a blade, said blade being mounted on said member for pitch changing movement, a blade pitch changing member extending from said blade, a bracket fixed to said blade supporting member on each side of said pitch changing member, and a parallel linkage having two of its corners pivoted at each of said brackets, said parallel linkage being connected to said pitch changing member to transfer its movement thereto.

29. A rotor for an aircraft including in combination, a blade supporting member, a blade, said blade being mounted on said member for pitch changing movement, a blade pitch changing member extending from said blade, a bracket fixed to said blade supporting member on each side of said pitch changing member, and a parallel linkage having two of its side links pivoted at each of said brackets, a third link connecting the free ends of the side links, said parallel linkage being connected by its third link to said pitch changing member to transfer its movement thereto.

30. In combination in an aircraft, a rotor having a plurality of blades, said rotor being supported on a nonrotating mast, first means for actuating said blades, said first means having a swash plate, a unit mounting said swash plate on said mast, said unit having an annular ring around said mast, second means pivotally mounting said swash plate on said ring, and third means pivotally mounting said ring on said mast, said third means being moveable axially on said mast.

31. In combination in an aircraft, a rotor having a plurality of blades, said rotor being supported on a nonrotating mast, first means for actuating said blades, said first means including a swash plate, a unit mounting said swash plate on said mast, said unit having an annular ring around said mast, second means pivotally mounting said swash plate on said ring, and third means pivotally mounting said ring on said mast, said mast having opposed slots, said third means being moveable axially in said slots.

References Cited in the file of this patent

UNITED STATES PATENTS

| | | |
|---|---|---|
| 2,405,777 | Buivid | Aug. 13, 1946 |
| 2,424,769 | Page | July 29, 1947 |
| 2,517,509 | Sikorsky | Aug. 1, 1950 |
| 2,549,886 | Buivid | Apr. 24, 1951 |
| 2,623,597 | Miller | Dec. 30, 1952 |
| 2,629,570 | Carnahan | Feb. 24, 1953 |

FOREIGN PATENTS

| | | |
|---|---|---|
| 444,095 | Great Britain | Mar. 13, 1932 |